No. 779,989. Patented January 10, 1905.

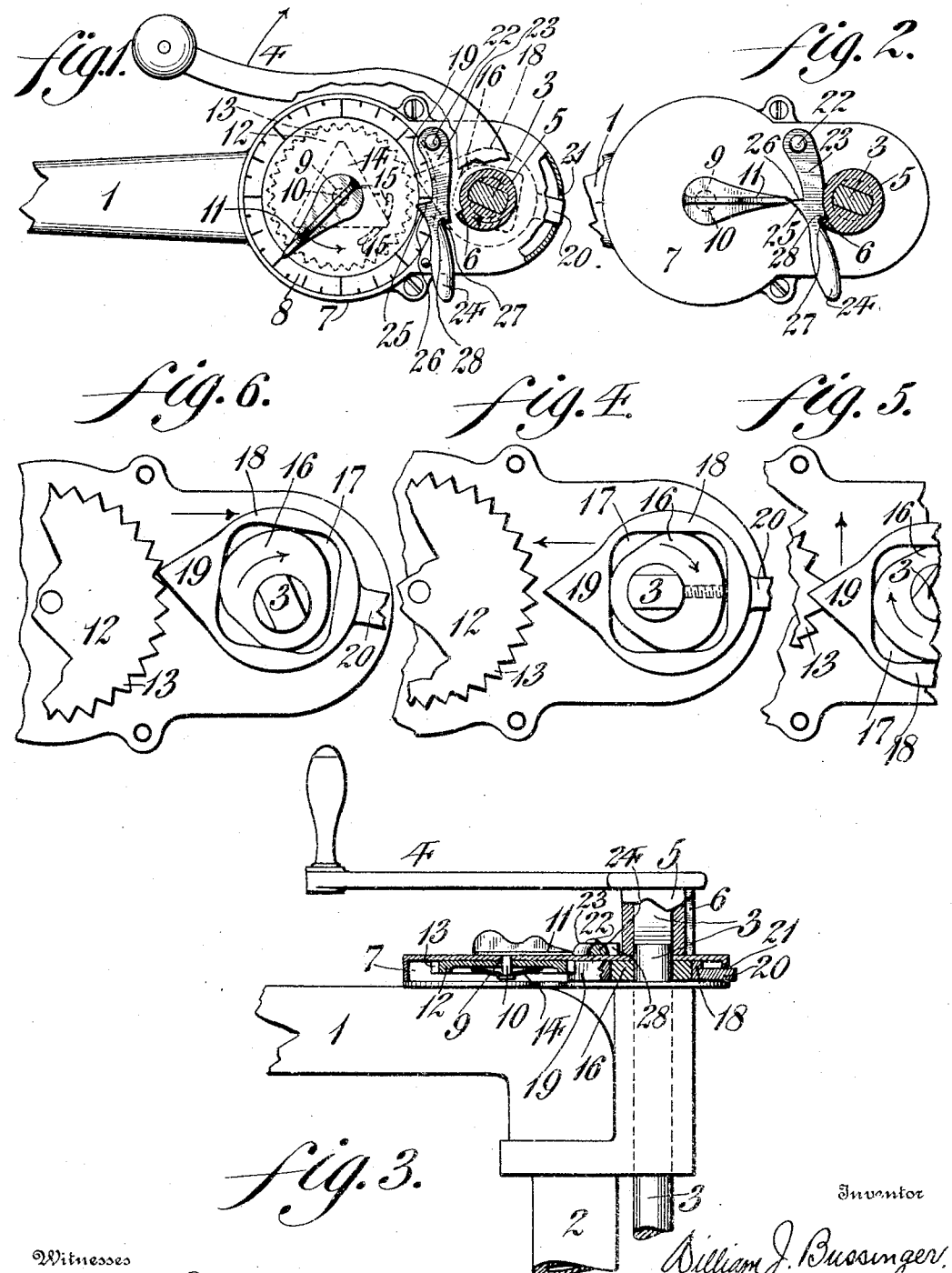

UNITED STATES PATENT OFFICE.

WILLIAM J. BUSSINGER, OF PHILADELPHIA, PENNSYLVANIA, ASSIGNOR TO HIMSELF, THOMAS DEVLIN, LOUIS J. McGRATH, WILLIAM O. THOMPSON, AND JOHN FINNEGAN, TRADING AS NATIONAL SPECIALTY MANUFACTURING COMPANY.

MEASURING DEVICE FOR FLUID-PUMPS.

SPECIFICATION forming part of Letters Patent No. 779,989, dated January 10, 1905.

Application filed June 18, 1904. Serial No. 213,128.

*To all whom it may concern:*

Be it known that I, WILLIAM J. BUSSINGER, a citizen of the United States, residing in the city and county of Philadelphia, State of Pennsylvania, have invented a new and useful Improvement in Measuring Devices for Fluid-Pumps, of which the following is a specification.

My invention relates to registering devices, and particularly to those used in connection with a pump for registering the number of strokes given the pump, and hence the volume of liquid delivered.

It consists of means for automatically stopping the further movement of the pump at the end of a predetermined number of strokes and of novel means for rotating the registering device.

It further consists of novel features of construction, all as will be hereinafter fully set forth.

Figure 1 is a top plan view of a registering device embodying my invention. Fig. 2 is a similar view showing the parts in a different position and with portions omitted for simplicity of illustration. Fig. 3 represents my device partly in elevation and partly in vertical section. Figs. 4, 5, and 6 are diagrammatic views showing the action of the registering device.

Similar numerals of reference indicate corresponding parts in the figures.

Referring to the drawings, 1 designates the head, and 2 the tube, of a pump, of which 3 is the actuating-rod. The pump shown is adapted for use as a barrel-pump, the pump mechanism being at the foot of the tube and of the rod and so well known in the art as not to require illustration.

4 is a handle adapted to engage with the upper end of the rod 3 and affording means for rotating the same. On the barrel portion 5 of the handle 4 is a radially-projecting lug 6, the function of which will appear. Mounted on the head 1 of the pump is a casing 7, bearing a dial 8. Extending through an axial aperture 9 in the dial 8 is a pivot-pin 10, on which is mounted, exterior of the casing 1, a pointer 11. Secured on the pivot 10 so as to rotate therewith and within the casing 7 is a gear 12, having teeth 13. A spring 14, shown as triangular in form and held in position by the engagement of one of its points between lugs 15 in the casing, acts to hold the gear 12 in frictional contact with the under side of the top of the casing 7. Secured to the rod 3 within the casing 7 is a cam 16, moving in a recess 17 within a dog 18. The dog 18 is provided with a tooth 19, adapted to mesh with the teeth 18 of the gear 12, and with a tail 20, moving in a notch or recess 21 in the casing 7. Pivoted at 22 on the upper side of the casing 7 is a lever 23, shown as provided with a handle 24, with a cam-surface 25 terminating in a shoulder 26 and with a recess 27 terminating in the shoulder 28.

The operation is as follows: The capacity of the pump being assumed to be one gill at each stroke, it is evident that eight rotations of the rod 3 will deliver a quart of the liquid or that thirty-two rotations will deliver a gallon. The gear 12 is therefore provided with thirty-two teeth 13, and the dial 8 is marked to indicate a gallon, quarts, and fractions thereof. To draw a given amount of liquid, as three pints, the pointer 11 is set on the dial, as shown in Fig. 1 of the drawings. The handle 4 is then turned in the direction of the arrow, Fig. 1. It is obvious that when twelve rotations have been given the handle the pointer 11, riding on the cam 25, will have moved the lever 23 to the position shown in Fig. 2 of the drawings, so that its shoulder 28 is interposed in the path of the lug 6 on the barrel portion of the handle 4, thus preventing its further rotation. The means by which the pointer 11 is moved step by step through the engagement of the tooth 19 of the dog 18 successively with the teeth 13 of the gear 12 is clearly shown in Figs. 4, 5, and 6 of the drawings. Fig. 4 shows the dog 18 as about to be forced forward in the direction of the arrow by the cam 16 to the engaging position. (Shown in Fig. 5.) The further movement of the cam 16 carries the tooth 19 in the direction of the arrow, Fig. 5, until it clears the tooth 13 with which it is then engaged and which of course has moved therewith. The dog 18 then begins to move away from the gear 12, as shown by the arrow in Fig. 6 of the drawings, and afterward in the opposite direction to the arrow shown in Fig. 5 until the tooth 19 engages with the next tooth 13 of the gear 12. It will be seen that the dog 18 is free to move in a longitudinal direction and is restrained as to its lateral movement by the engagement of its tail 20 in the recess 21 in the casing 7.

It will be seen that my device affords a simple, effective, and durable means of predetermining the number of strokes to be given the pump and for preventing its rotation thereafter.

It will be evident that various changes may be made by those skilled in the art which may come within the scope of my invention, and I do not, therefore, desire to be limited in every instance to the exact construction herein shown and described.

Having thus described my invention, what I claim as new, and desire to secure by Letters Patent, is—

1. A pump registering device comprising a pump-actuating rod, a lug on said rod, a pointer manually adjustable from a normal position and returnable thereto by the movement of said rod, and a movable portion interposed between said pointer and said rod and adapted to be moved by said pointer into the path of the lug on said rod, whereby the further rotation of said rod is prevented.

2. A pump-actuating device comprising a pump-actuating rod, a lug on said rod, a casing, a pointer exterior of said casing and manually adjustable from a normal position, means within said casing whereby the movement of said rod acts to return said pointer step by step to such normal position, and a lever interposed between said pointer and said rod and adapted to be moved by said pointer into the path of the lug on said rod, whereby the further rotation of said rod is prevented.

3. A pump registering device comprising a pump-actuating rod, a lug on said rod, a casing, a dial on said casing, a pointer exterior of said casing and manually adjustable from a normal position to a predetermined point on said dial, a gear in said casing rotatable with said pointer, means movable with said rod for actuating said gear step by step, and a lever pivoted exterior of said casing and having a cam-surface adapted to be engaged by said pointer and a shoulder adapted to engage with a lug on said rod, whereby through the movement of said lever caused by the return of said pointer to its normal position, a further rotation of said rod is prevented.

4. In a pump registering device, a rotary pump-actuating rod, a cam on said rod, a registering device including a gear, and a bodily-movable dog actuated by said cam and adapted to move toward and away from the gear to engage successively with the teeth thereof as said rod is rotated.

5. In a pump registering device, a rotary pump-actuating rod, a cam on said rod, a registering device including a gear and a bodily-movable dog in which said cam is mounted and having a tooth adapted to engage successively with the teeth of said gear as said rod is rotated, and means for properly guiding said dog.

6. In a pump registering device, a rotary pump-actuating rod, a cam on said rod, a registering device including a gear and a bodily-movable dog inclosing said cam and having a tail engaging in a recess by which its lateral motion is restrained and a tooth adapted to engage successively with the teeth of said gear as said rod is rotated.

7. A pump registering device comprising a casing, a rotary pump-actuating rod passing through said casing, a lug on said rod exterior of said casing, a cam on said rod within said casing, a gear within said casing, a pointer exterior of said casing and rotatable with said gear, a lever exterior of said casing and interposed in the path of both said pointer and of said lug, and a dog in said casing inclosing said cam and having a tooth engageable successively with the teeth of said gear as said rod is rotated.

WILLIAM J. BUSSINGER.

Witnesses:
    John A. Wiedersheim,
    C. D. McVay.